United States Patent
Coffin et al.

(10) Patent No.: US 8,529,197 B1
(45) Date of Patent: Sep. 10, 2013

(54) GAS TURBINE ENGINE FAN DRIVE GEAR SYSTEM DAMPER

(75) Inventors: James B. Coffin, Windsor, CT (US); John R. Otto, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/432,699

(22) Filed: Mar. 28, 2012

(51) Int. Cl.
*F01D 25/04* (2006.01)

(52) U.S. Cl.
USPC ........................................ 415/119; 415/124.1

(58) Field of Classification Search
USPC ................ 415/119, 122.1, 124.2, 124.1, 229; 416/500
See application file for complete search history.

(56) References Cited

U.S. PATENT DOCUMENTS

| | | | |
|---|---|---|---|
| 4,213,661 A | 7/1980 | Marmol | |
| 4,679,464 A | 7/1987 | Castellani | |
| 4,856,377 A | 8/1989 | Goudreau et al. | |
| 5,433,674 A * | 7/1995 | Sheridan et al. | 475/346 |
| 6,183,388 B1 | 2/2001 | Hawkins | |
| 6,663,526 B2 | 12/2003 | Janson | |
| 7,485,066 B2 | 2/2009 | Bailey et al. | |
| 7,704,178 B2 * | 4/2010 | Sheridan et al. | 475/159 |
| 7,959,406 B2 | 6/2011 | Suciu et al. | |
| 2010/0034657 A1 * | 2/2010 | Hunt et al. | 416/190 |
| 2010/0105516 A1 * | 4/2010 | Sheridan et al. | 475/346 |
| 2011/0123326 A1 | 5/2011 | Dibenedetto et al. | |
| 2011/0130246 A1 | 6/2011 | McCune et al. | |

FOREIGN PATENT DOCUMENTS

| | | |
|---|---|---|
| EP | 2339146 | 6/2011 |
| JP | 61-286531 | 12/1986 |
| WO | 95/27860 | 10/1995 |

OTHER PUBLICATIONS

International Search Report for PCT Application No. PCT/US2013/033643, Jul. 2, 2013.

* cited by examiner

*Primary Examiner* — Edward Look
*Assistant Examiner* — William Grigos
(74) *Attorney, Agent, or Firm* — Carlson, Gaskey & Olds, P.C.

(57) ABSTRACT

A gas turbine engine includes a fan section. A turbine section is coupled to the fan section via a geared architecture. The geared architecture includes a torque frame and a flex support spaced apart from one another at a location. A gear train is supported by the torque frame. A damper is provided between the torque frame and the flex support at the location.

11 Claims, 2 Drawing Sheets

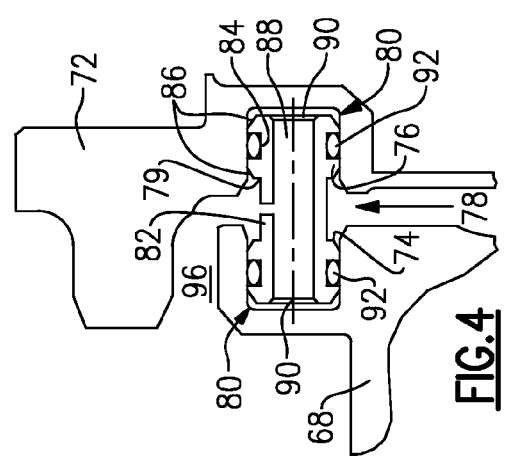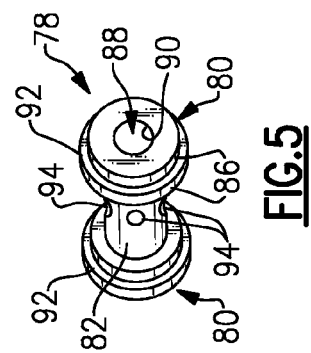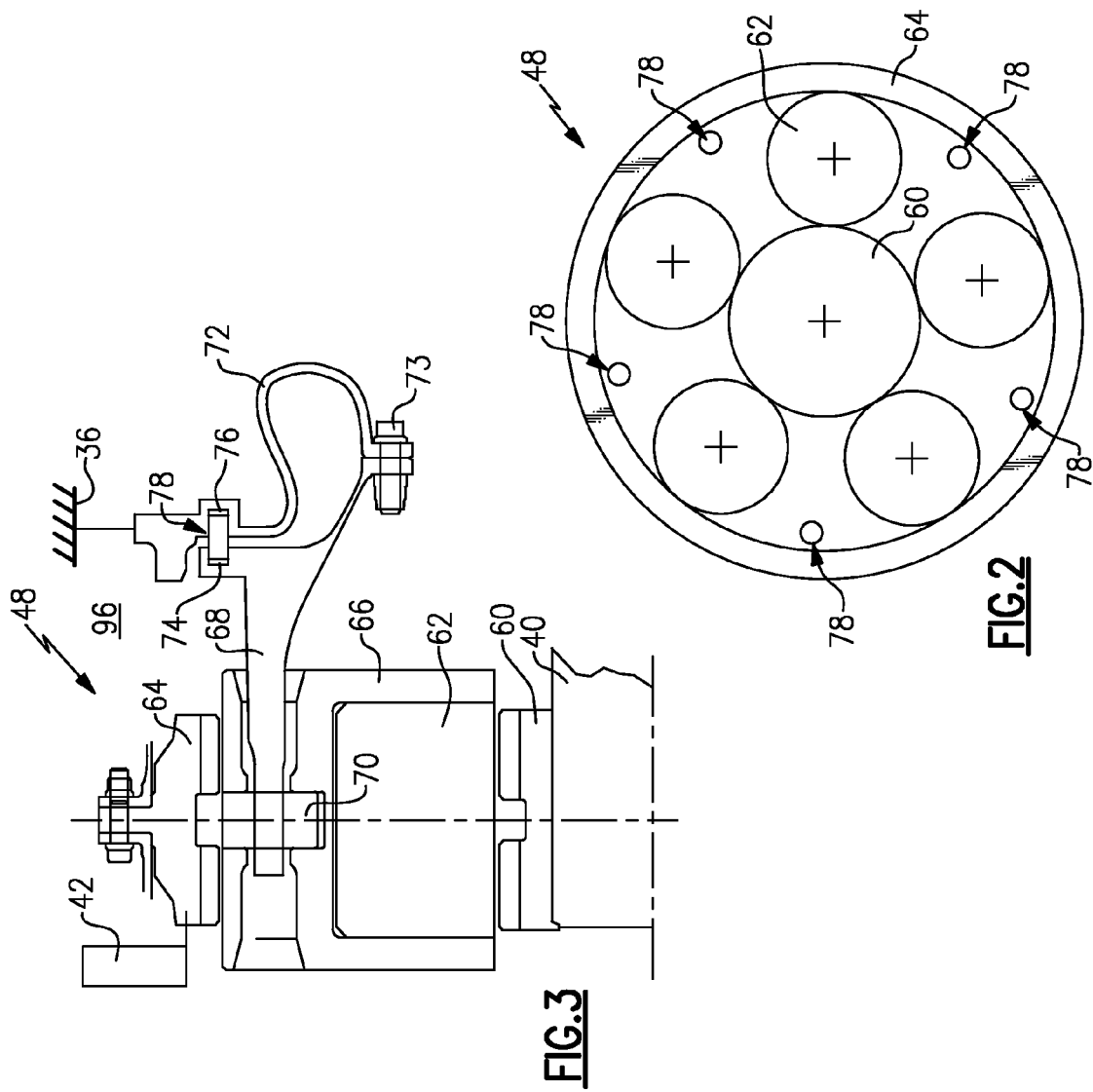

GAS TURBINE ENGINE FAN DRIVE GEAR SYSTEM DAMPER

BACKGROUND

This disclosure relates to a damper for a fan drive gear system for a gas turbine engine.

Gear trains are used in gas turbine engines to provide a gear reduction between a turbine section and a fan, for example. The gear train is supported relative to a static structure. During operation, the gear train generates vibrational inputs to the static structure and other components, which may be undesirable. Additionally, the supporting structure may transmit vibrational inputs to the fan drive gear system that may be coincident or undesirable to the fan drive gear system. Typically, a flex support having a bellow secures the gear train to the static structure to permit some relative movement between the gear train and the static structure.

SUMMARY

In one exemplary embodiment, a fan drive gear system for a gas turbine engine includes first and second members spaced apart from one another at a location. A gear train is supported by the first member. A damper is provided between the first member and the second member at the location.

In a further embodiment of any of the above, the first member is a torque frame. The second member is a flex support having a bellow. The flex support is grounded to a static structure.

In a further embodiment of any of the above, the torque frame and flex support are secured to one another by fasteners in an area spaced radially inward from the location.

In a further embodiment of any of the above, multiple dampers are arranged circumferentially between the torque frame and the flex support. The bellow is provided between the fasteners and the dampers.

In a further embodiment of any of the above, the torque frame supports a carrier to which star gears are mounted. A sun gear is arranged centrally relative to and intermeshes with the star gears. A ring gear circumscribes and intermeshes with the star gears.

In a further embodiment of any of the above, a fan is coupled to the ring gear and a low speed spool is coupled to the sun gear.

In a further embodiment of any of the above, the first and second members respectively include first and second apertures aligned with one another in an axial direction. The damper extends between and is received in the first and second apertures.

In a further embodiment of any of the above, the damper is a tube that has opposing ends each supporting a seal. Each seal engages a respective first and second aperture.

In a further embodiment of any of the above, the tube provides a cavity. An orifice is provided in the tube in fluid communication with the cavity. The cavity provides a viscous damping chamber between the first and second members.

In a further embodiment of any of the above, at least one of the gear train and the second member is configured to produce a vibrational input. The orifice and viscous damping chamber is configured to damp the vibrational input.

In a further embodiment of any of the above, each end includes an annular groove that receives a respective seal and lateral sides are provided on each end with the respective end's annular groove provided between the lateral sides. The lateral sides provide annular tapers that extend radially inward away from the respective end's annular groove and are configured to permit articulation of the damper relative to the first and second members.

In a further embodiment of any of the above, the tube includes a neck arranged between ends and has a diameter that is smaller than a diameter of the ends.

In one exemplary embodiment, a damper for a gas turbine engine fan drive gear system includes a tube having opposing ends each with an annular groove. A neck is arranged between ends and has a diameter that is smaller than a diameter of the ends. Lateral sides are provided on each end with the respective end's annular groove provided between the lateral sides. The lateral sides provide annular tapers that extend radially inward away from the respective end's annular groove. The tube provides a cavity that has an opening at each of the ends and an orifice is provided in the tube in fluid communication with the cavity.

In a further embodiment of any of the above, a seal is arranged in each of the annular grooves.

In a further embodiment of any of the above, multiple orifices are provided about a circumference of the neck.

In one exemplary embodiment, a gas turbine engine includes a fan section. A turbine section is coupled to the fan section via a geared architecture. The geared architecture includes a torque frame and a flex support spaced apart from one another at a location. A gear train is supported by the torque frame and a damper is provided between the torque frame and the flex support at the location.

In a further embodiment of any of the above, the gas turbine engine includes a sun gear. Star gears are supported by the carrier and a ring gear circumscribes the star gears. The star gears intermesh with the sun gear and the ring gear.

In a further embodiment of any of the above, the fan section includes a fan coupled to the ring gear and the turbine section includes a high pressure turbine section and a low pressure turbine section. A low speed spool supports the low pressure turbine section and is coupled to the sun gear. The torque frame is grounded to a static structure.

In a further embodiment of any of the above, the flex support has a bellow. The flex support is grounded to a static structure and multiple dampers are arranged circumferentially between the torque frame and the flex support.

In a further embodiment of any of the above, the torque frame and the flex support respectively include first and second apertures aligned with one another in an axial direction. The damper extends between and is received in the first and second apertures. The damper is provided by a tube having opposing ends each supporting a seal. Each seal engages a respective first and second apertures. The tube provides a cavity and an orifice is provided in the tube in fluid communication with the cavity. The cavity provides a viscous damping chamber between the torque frame and the flex support.

BRIEF DESCRIPTION OF THE DRAWINGS

The disclosure can be further understood by reference to the following detailed description when considered in connection with the accompanying drawings wherein:

FIG. 2 is a schematic view of an epicyclic gear train embodiment for a fan drive gear system.

FIG. 3 is a partial cross-sectional schematic view of a fan drive gear system embodiment.

FIG. 4 is an enlarged view of a portion of the fan drive gear system shown in FIG. 2.

FIG. 5 is a perspective view of a damper embodiment shown in FIG. 4.

DETAILED DESCRIPTION

Figure 1:
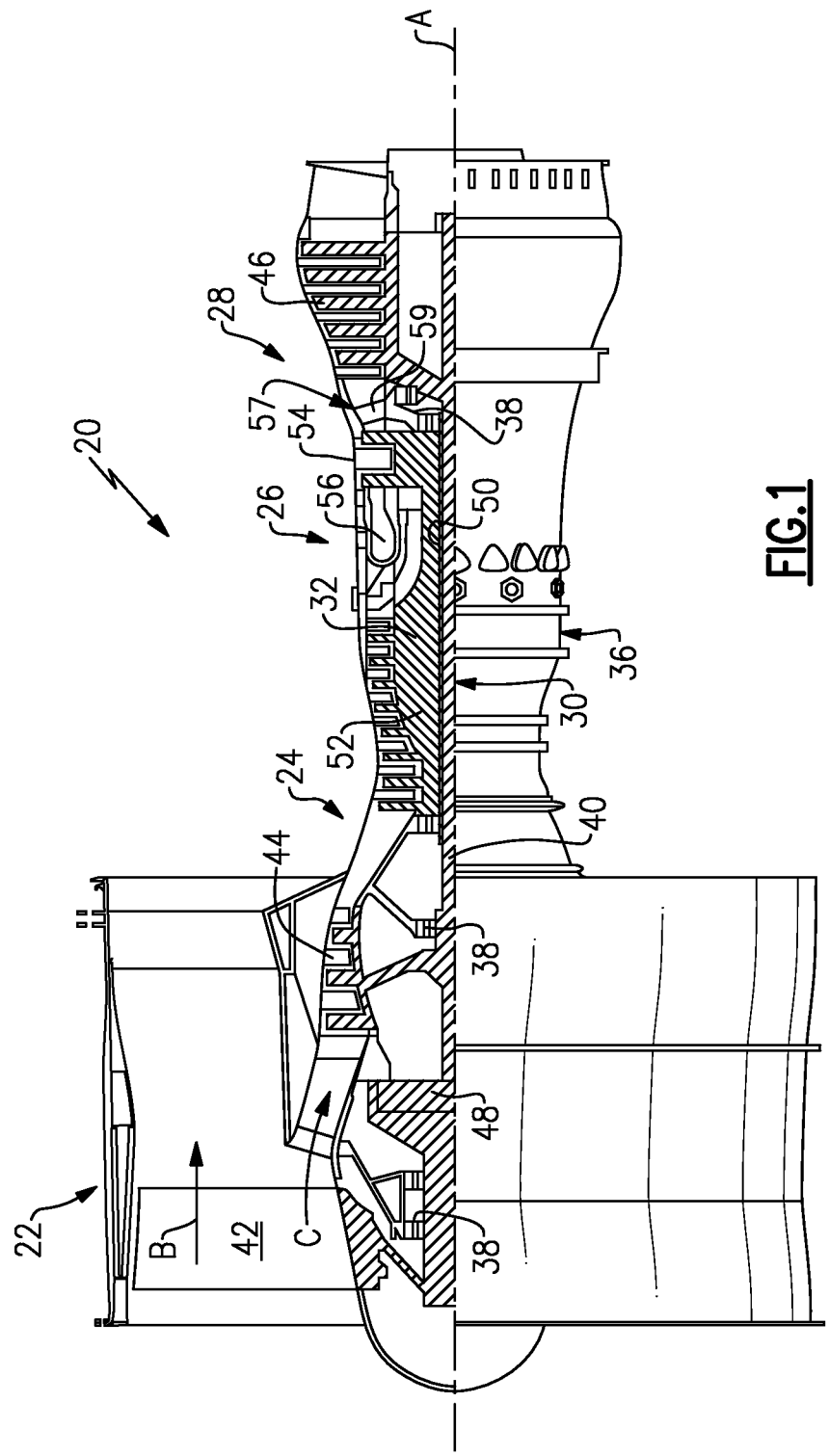
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tambient deg R})/518.7]^{0.5}$. The "Low corrected fan tip speed" as disclosed herein according to one non-limiting embodiment is less than about 1150 ft/second.

An example geared architecture 48 is schematically shown in a gear compartment 96 in FIGS. 2 and 3. The geared architecture 48 includes a sun gear 60, which is coupled to the inner shaft 40, as illustrated in FIG. 3. Star gears 62 are arranged circumferentially about the sun gear 60 and intermesh with the sun gear 60 and a ring gear 64, which circumscribes the star gear 62. In one example, the ring gear 64 is coupled to the fan 42. It should be understood that the geared architecture 48 illustrated in FIGS. 2 and 3 is exemplary only and can be configured other than illustrated.

A carrier 66 supports the star gears 62 relative to the sun gear 60 and ring gear 64. A torque frame 68 is connected to the carrier 66 by pins 70. The torque frame 68 is secured to the static structure 36 by a flex support 72, which has a bellow for permitting slight movement of the geared architecture 48 relative to the static structure 36. In the example, fasteners 73 secure the torque frame 68 and the flex support 72, which are metallic in one example, to one another to facilitate assembly and disassembly of the geared architecture 48. However, the torque frame 68 and flex support 72 are also spaced apart from one another in an axial direction at a location radially outward from the fasteners 73.

Referring to FIGS. 3 and 4, the torque frame 68 and flex support 72 respectively include first and second apertures 74, 76 that are aligned with one another in the axial direction. A damper 78, which is metallic in one example, is provided between the torque frame 68 and flex support 72 and received within the first and second apertures 74, 76, the geared architecture 48, provide desired stiffness and/or avoid natural frequencies. In one example, multiple dampers are arranged circumferentially between the torque frame 68 and flex support 72, as illustrated in FIG. 2. It should be understood that the dampers 78 may be configured in any desirable configuration and more or fewer dampers 78 may be used than illustrated.

Referring to FIGS. 4 and 5, the damper 78 is provided by a tube 79 includes opposing ends 80 with a neck 82 arranged between the ends 80. The neck 82 has a diameter that is smaller than a diameter of the ends 80. Each end 80 includes an annular groove 84 that receives a seal 92. Lateral sides 86 are provided on each end 80 with the annular groove 84 arranged between the lateral sides 86. The lateral sides 86 provide an annular taper that extends radially inward from the annular groove 84. The smaller diameter neck 82 and the tapered lateral sides 86 enables the damper 78 to articulate within the first and second apertures 74, 76 about the seals 92 during vibrations without permitting metal-to-metal contact between the damper 78 and the torque frame 68 or the flex support 72.

The damper 78 includes a cavity 88 that extends along its axial length between openings 90 provided at each end 80. The cavity 88 provides a viscous damping chamber. One or more orifices 94 are provided in the neck 82, for example, and are in fluid communication with the cavity 88. The orifices 94 permit an oil-mist in the gear compartment 96 to enter the cavity 88. Any oil collecting in the cavity 88 may drain through the orifices 94. The volume of the cavity 88 and the size, number and configuration of the orifices 94 are configured to damp a vibrational input from the geared architecture 48.

Although an example embodiment has been disclosed, a worker of ordinary skill in this art would recognize that certain modifications would come within the scope of the claims. For that reason, the following claims should be studied to determine their true scope and content.

What is claimed is:

1. A fan drive gear system for a gas turbine engine comprising:
   first and second members spaced apart from one another at a location;
   a gear train supported by the first member; and
   a damper provided between the first member and the second member at the location, the damper is configured to engage the first and second members substantially throughout engine operation.

2. The fan drive gear system according to claim 1, wherein the first member is a torque frame, and the second member is a flex support having a bellow, the flex support grounded to a static structure.

3. The fan drive gear system according to claim 2, wherein the torque frame and flex support are secured to one another by fasteners in an area spaced radially inward from the location.

4. The fan drive gear system according to claim 3, wherein multiple dampers are arranged circumferentially between the torque frame and the flex support, and the bellow is provided between the fasteners and the dampers.

5. The fan drive gear system according to claim 2, wherein the torque frame supports a carrier to which star gears are mounted, a sun gear is arranged centrally relative to and intermeshing with the star gears, and a ring gear circumscribing and intermeshing with the star gears.

6. The fan drive gear system according to claim 5, comprising a fan coupled to the ring gear, and a low speed spool coupled to the sun gear.

7. The fan drive gear system according to claim 1, wherein the first and second members respectively include first and second apertures aligned with one another in an axial direction, the damper extending between and received in the first and second apertures.

8. A gas turbine engine comprising:
   a fan section;
   a turbine section coupled to the fan section via a geared architecture, the geared architecture including:
      a torque frame and a flex support spaced apart from one another at a location;
      a gear train supported by the torque frame; and
      a damper provided between the torque frame and the flex support at the location, the damper is configured to engage the first and second members substantially throughout engine operation.

9. The gas turbine engine according to claim 8, comprising a sun gear, star gears supported by the carrier, and a ring gear circumscribing the star gears, the star gears intermeshing with the sun gear and the ring gear.

10. The gas turbine engine according to claim 9, wherein the fan section includes a fan coupled to the ring gear, and the turbine section includes a high pressure turbine section and a low pressure turbine section, and a low speed spool supporting the low pressure turbine section and coupled to the sun gear, the torque frame grounded to a static structure.

11. The gas turbine engine according to claim 8, wherein the flex support has a bellow, the flex support grounded to a static structure, and multiple dampers are arranged circumferentially between the torque frame and the flex support.

* * * * *

UNITED STATES PATENT AND TRADEMARK OFFICE
CERTIFICATE OF CORRECTION

PATENT NO. : 8,529,197 B1  
APPLICATION NO. : 13/432699  
DATED : September 10, 2013  
INVENTOR(S) : Coffin et al.

Page 1 of 1

It is certified that error appears in the above-identified patent and that said Letters Patent is hereby corrected as shown below:

IN THE CLAIMS:

Claim 8, Column 6, Line 25:

"engage the first and second members substantially"

should read as

--engage a first member and a second member substantially--

Signed and Sealed this
Twenty-ninth Day of October, 2013

Teresa Stanek Rea
*Deputy Director of the United States Patent and Trademark Office*